United States Patent [15] 3,672,687
Ben Daniel et al. [45] June 27, 1972

[54] AUDIO REPRODUCING APPARATUS FOR RANDOM ACCESS PLAYBACK SYSTEMS

[72] Inventors: David J. Ben Daniel, Schenectady; John O. Fielding, Ballston Lake; Henry Hurwitz, Jr., Schenectady, all of N.Y.

[73] Assignee: General Electric Company

[22] Filed: May 26, 1969

[21] Appl. No.: 827,792

[52] U.S. Cl. ......................274/9 RA, 274/15 R, 179/100.4 D
[51] Int. Cl. ....................................G11g 21/08, G11b 21/12
[58] Field of Search ..................................274/9, 13–15, 42, 274/17, 20–22; 340/174.1 C

[56] References Cited

UNITED STATES PATENTS

| | | | |
|---|---|---|---|
| 3,383,114 | 5/1968 | Ryan | 274/9 X |
| 3,082,006 | 3/1963 | Ryan | 274/1 A |
| 3,506,269 | 4/1970 | Hannah | 274/1 R |
| 1,340,358 | 5/1920 | Ahearn | 274/15 |
| 1,998,105 | 4/1935 | Sullivan | 274/9 |
| 2,268,180 | 12/1941 | Blethen | 274/9 |
| 2,680,150 | 6/1954 | Weld | 274/42 X |
| 2,952,464 | 9/1960 | Stimuler | 274/15 |
| 2,953,383 | 9/1960 | Walters | 274/15 |
| 2,953,384 | 9/1960 | Walters | 274/15 |
| 3,212,074 | 10/1965 | Daniels | 340/174.1 C |
| 3,337,852 | 8/1967 | Lee | 340/174.1 C |
| 3,511,509 | 5/1970 | Firestone | 274/9 |

*Primary Examiner*—Leonard Forman
*Assistant Examiner*—Dennis A. Dearing
*Attorney*—Paul A. Frank, Richard R. Brainard, Charles T. Watts, Frank L. Neuhauser, Oscar B. Waddell and Joseph B. Forman

[57] ABSTRACT

Audio playback apparatus is disclosed including a tone arm which is positioned electromagnetically to facilitate control thereof in accordance with the position of a turntable relative to the tone arm. The apparatus is particularly suited for random access retrieval of audio information from a record including a plurality of nested spirals each corresponding to items of information on a display or selection chart. An array of switches corresponding to individual items on the display and a position selector switch assembly operated by the position of the turntable relative to the tone arm cooperate to position the stylus of the tone arm in a spiral groove corresponding to the selected portion of the display.

2 Claims, 8 Drawing Figures

INVENTORS:
DAVID J. BEN DANIEL,
JOHN O. FIELDING;
HENRY HURWITZ, JR.,
by Richard R. Brainard
THEIR ATTORNEY INVENTORS:
DAVID J. BEN DANIEL
JOHN O. FIELDING,
HENRY HURWITZ, JR.,
by Richard R. Brainard
THEIR ATTORNEY INVENTORS:
DAVID J. BEN DANIEL;
JOHN O. FIELDING;
HENRY HURWITZ, JR.,
by Richard R. Brainard
THEIR ATTORNEY INVENTORS:
DAVID J. BEN DANIEL;
JOHN O. FIELDING;
HENRY HURWITZ, JR.,
by Richard R. Brainard
THEIR ATTORNEY

INVENTORS:
DAVID J. BEN DANIEL;
JOHN O. FIELDING;
HENRY HURWITZ, JR.

by Richard R. Brainard
THEIR ATTORNEY

AUDIO REPRODUCING APPARATUS FOR RANDOM ACCESS PLAYBACK SYSTEMS

INTRODUCTION

This invention relates to audio playback apparatus which is particularly suited for random access of information recorded on individual spirals of a nested spiral record.

In order to facilitate the electrical control of the tone arm and particularly the position of the stylus relative to a particular groove of a record, both the raising and the lowering of the tone arm and, in one embodiment, its initial radial movement are electromagnetically controlled. This facilitates control of the tone arm electrically in accordance with an array of switches for selecting circumferential positions at which the tone arm is lowered in accordance with information which it is desired to retrieve. The positional relationship between the record and the stylus of the tone arm is controlled by switching means actuated by the position of the turntable and record. In one embodiment, the tone arm is controlled by a single electromagnet which controls the raising and lowering of the tone arm under the control of the information selecting array of switches and the positional switch operated by the position of the turntable. This embodiment is particularly useful for retrieving information from a record including a number of nested spiral grooves each having information corresponding to a selecting switch and without a common annular groove at the outer periphery of the record. In a second embodiment, a second electromagnetic means is provided to initiate the inward radial movement of the tone arm. This embodiment is particularly suited for use with a record in which an annular master or ready groove near the outer periphery of the record intersets each of the nested spiral grooves at its outer end. In this embodiment, the tone arm is lowered into the ready groove by control of the first electromagnetic means and the particular nested spiral is selected by a second electromagnetic means which is controlled by the joint action of one of the selecting switches and the corresponding contact of the position selector switch.

It is a primary object of the present invention to provide a simplified audio playback apparatus making possible random access to recorded information.

It is another object of the invention to provide improved electrical control of the position of the tone arm of audio playback apparatus.

THE DRAWINGS

Further objects and advantages will become apparent as the following description proceeds, reference being had to the accompanying drawing and its scope will be pointed out in the appended claims.

DESCRIPTION OF ILLUSTRATED EMBODIMENTS

Figure 1:
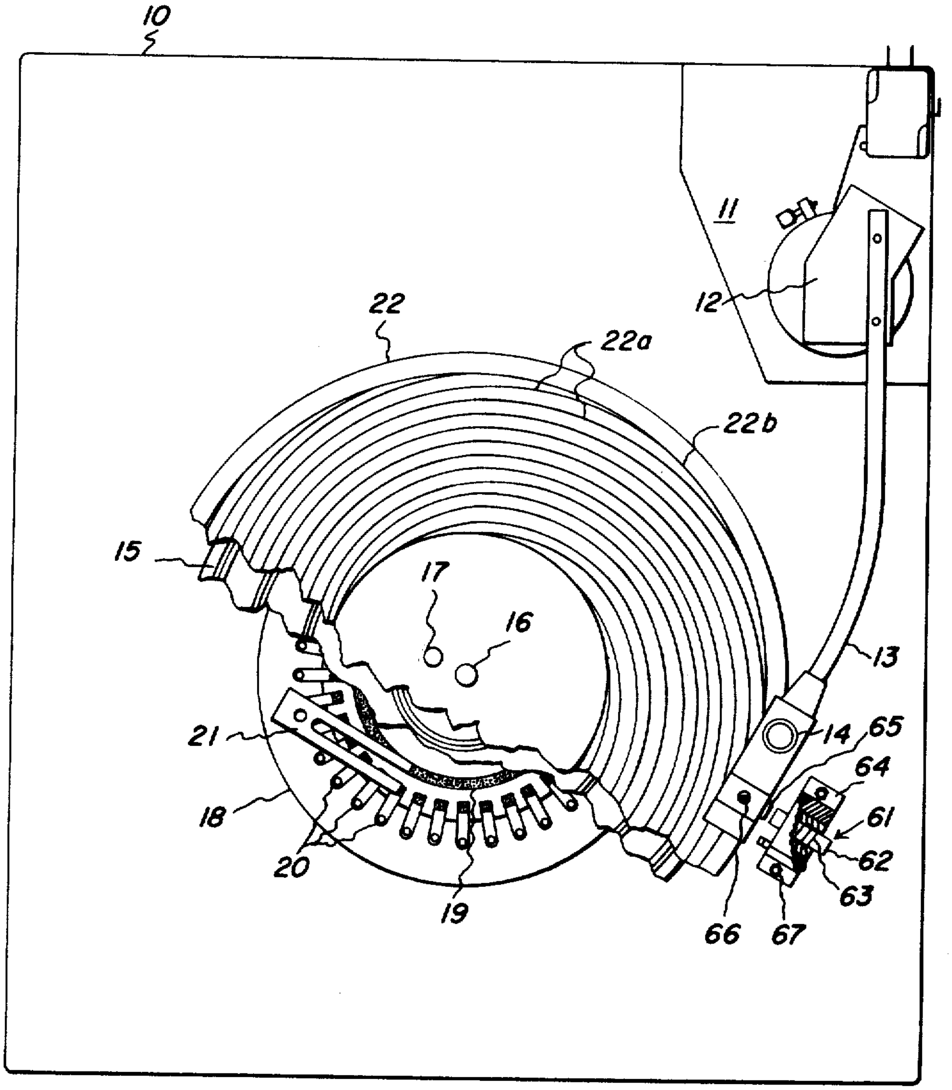
FIG. 1 is a top plan view of playback apparatus embodying the present invention partially broken away to show the construction of the position selecting switch.

Referring now to FIG. 1 of the drawings, the invention is shown embodied in a modified phonograph turntable including a rectangular cabinet 10 having mounted on the top surface thereof a tone arm operating assembly 11 including a pivoted support 12, tone arm 13, and head 14 for receiving and mounting the cartridge and stylus (not shown). The player includes a turntable 15 positioned about a central spindle 16 and driven by suitable motor and drive mechanism (not shown). The turntable includes an additional positioning spindle 17 to positively hold the record in fixed angular position on the turntable. Mounted from the cabinet beneath the turntable is an insulating board 18 carrying an annular contact 19 and an array of individual radially extending contacts 20 corresponding in number to the maximum number of nested grooves which may be individually selected by the record player and its associated control. A moveable bridging contact 21 is secured in insulated relation to the lower side of the turntable and positioned so as to connect individual ones of the contacts 20 to the annular contact 19 progressively as the turntable rotates. The contacts 19, 20 and 21 provide the position selector switch mechanism.

As shown, the record 22 may include a plurality of interleaved or nested spiral grooves 22*a*, each terminating at spaced points along its outer end near the periphery of the record. In the particular embodiment illustrated, only 16 grooves have been illustrated but it will be apparent that a much larger number may be employed and as many as 400 single-turn spirals can be accommodated. The position responsive selector switching mechanism shown includes 48 individual radial contacts and accordingly is suitable for use in making individual selection of a spiral groove from a record having 48 nested spiral grooves. The spiral grooves may merge at their outer ends with an annular guide or ready groove 22*b*.

Figures 2, 3:
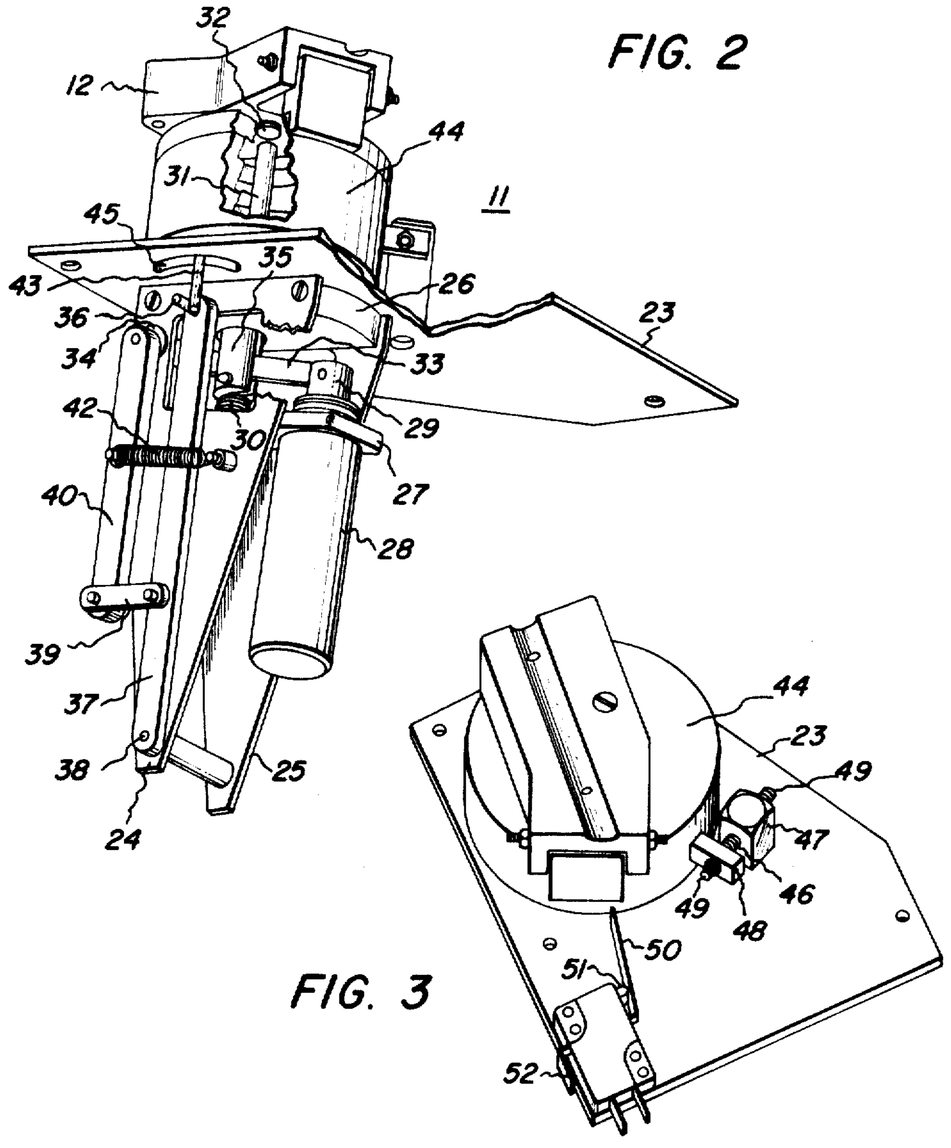
FIG. 2 is an isometric view partially broken away of the tone arm actuating mechanism.
FIG. 3 is a further isometric view of the tone arm mechanism.

In accordance with an important aspect of the present invention, the tone arm 13 is raised and lowered by a novel tone arm mechanism under the control of an electromagnet. The features and construction of the tone arm operating mechanism will be more apparent from a consideration of FIG. 2. As is illustrated, this mechanism includes a mounting plate 23 to the lower face of which is secured a frame including spaced side members 24 and 25 secured to an upper end member 26 which is in turn secured to the mounting plate 23.

A transverse plate 27 spaced from the plate 26 in generally parallel relation therewith provides support for an actuating solenoid 28 including armature 29. The plate 27 also provides a bearing surface for a compression spring 30 which urges the armature 31 upwardly toward engagement with an adjustable stop 32 in the pivoted mounting arm 12. Actuating arm 33 is fixed to a shaft 34 journaled in the frame members 24 and 25 and extends through a slot in the plunger 31 and is pinned to the upper end of the armature 29. From the above, it is apparent that energization of the solenoid retracts the plunger 31 and lowers pivoted arm 12 which in turn lowers the tone arm into engagement with the record. When the solenoid is de-energized, the spring 30 urges the plunger upwardly to lift the pivoted member 12 and in this way lift the tone arm.

In addition to controlling the raising and lowering of the tone arm, actuation of the solenoid also releases a moveable stop to permit rotational motion of the tone arm assembly. A moveable stop 36 extends outwardly from arm 37 pivoted at point 38 at the lower end of the mounting plates 24 and 25. This arm is coupled by an arm 39 to the lower end of an arm 40 which is fixed to shaft 34, which rotates with the operating arm 33. Energization of the solenoid moves the lower end of arm 40 in a clockwise direction to move arm 37 and the moveable stop 36 to the left and at the same time further charge coil spring 42. Movement of the moveable stop 36 to the left releases a pin 43 associated with the rotatable portion of the tone arm assembly including cylinder 44 which is mounted on suitable bearings carried by a hollow subassembly (not shown) supported from the upper face of plate 23 and surrounding plunger 31. The pin 43 extends through an arcuate slot 45 in the mounting plate 23.

The fully retracted position of the tone arm assembly is adjusted by adjustable stop 46 carried by a post 47 on the plate 23. The stop 46 engages member 48 extending radially from the moveable body portion 44 of the tone arm assembly. An adjustable stop or screw member 49 carried by member 48 engages the operating arm 50 of a microswitch when the tone arm is at the inward limit of its travel to open the circuit between the contacts 51 and 52 of the microswitch. This de-energizes solenoid 28 to effect lifting and return of the tone arm to its initial position, as will be described in more detail in connection with FIGS. 4 and 5.

Figure 4:
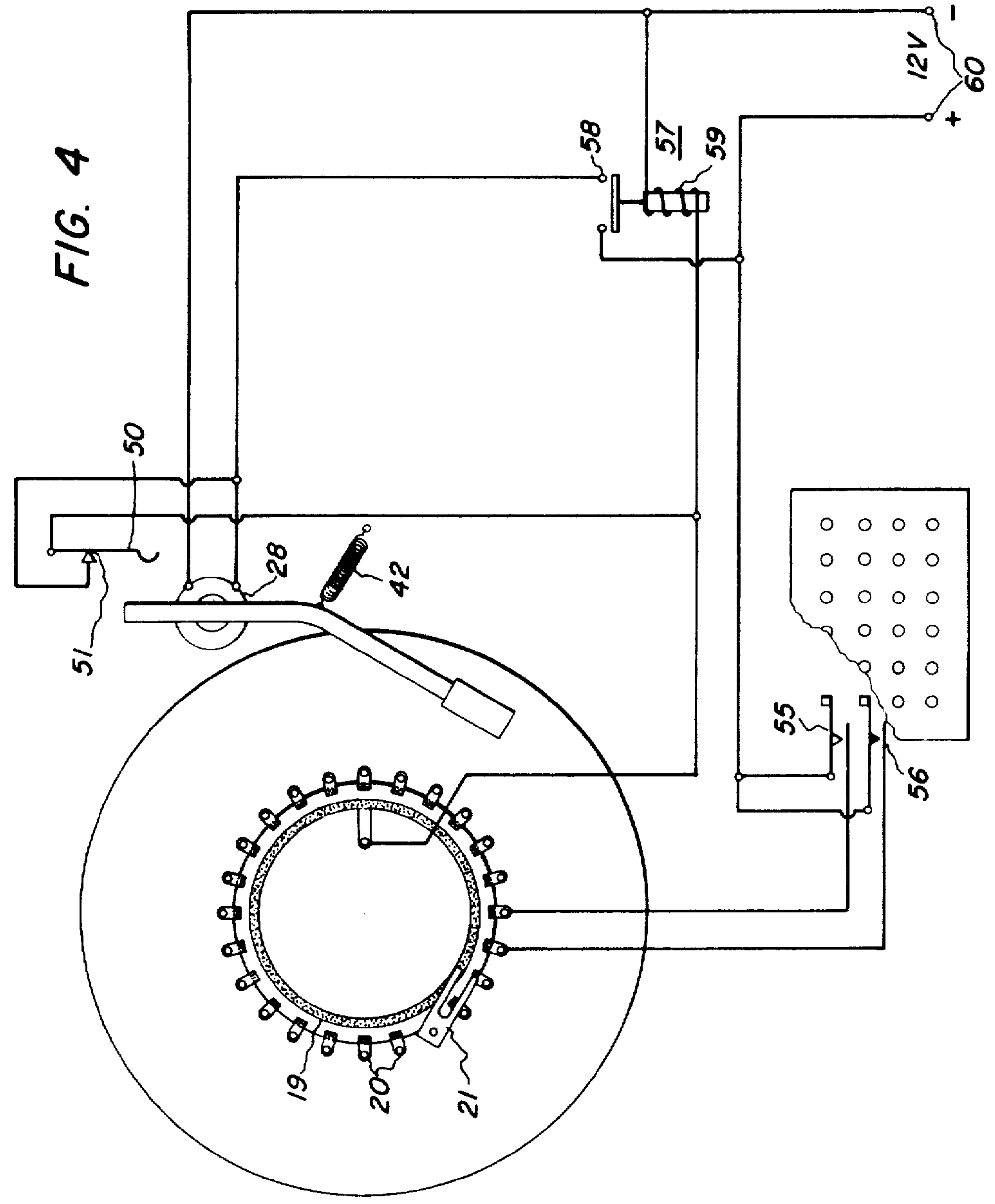
FIG. 4 is a schematic representation of the electrical control of the tone arm in accordance with one embodiment of the invention.

The manner in which control of the energization of the solenoid 28 is effective to start the stylus of the tone arm in a predetermined spiral groove corresponding to a selected bit of information will become more apparent from a consideration of the control circuit, schematically illustrated in FIG. 4. As shown in that figure, the turntable and tone arm assembly are schematically drawn merely to illustrate the electrical and operating features thereof including the position selector switch having contacts 19, 20 and 21 and the tone arm operating solenoid 28. As illustrated in FIG. 4, the tone arm is adapted to be lowered onto the record by the energization of solenoid 28 under the joint control of the position selector switch and an array of selector switches each corresponding to individual indicia or bits of information and each corresponding to a nested spiral bearing additional information relating to the same subject. In other words, the pushbutton arrays may carry indicia or displays associated with them with respect to which the operator may wish to select a spiral to obtain the additional recorded information.

The audio playback apparatus is particularly suited for use in a "talking book" system and in such an application the array of pushbuttons may be replaced by the selector switch arrangement described and claimed in BenDaniel and Comly application Ser. No. 827,608, filed concurrently herewith, and assigned to the assignee of this application. In that application, the display or indicia are the words or symbols on a page of text which overlies the array of pressure sensitive selector switch elements. Two of the switches have been illustrated schematically at 55 and 56, it being understood that the number of switches in the switch array corresponds to the number of contacts 20 as the selector switch and to the maximum number of nested spiral grooves on the record from which it is desired to make a selection. Also, as shown in FIG. 4, a relay 57 is provided with normally open contacts 58 and an operation coil 59. The control system is energized from a source of 12 volts DC indicated at 60 that may be obtained from the alternating current supply use which energizes the turntable drive motor by means of a rectifier bridge (not shown). The relay is effective upon energization of coil 59 to maintain a holding circuit for the tone arm operating solenoid 28 after the selection has been made and the stylus has started to play a selected groove. This insures that the tone arm remains in engagement with the record after the groove has been selected until the spiral groove has completed playing and the return switch contact 51 is operated as the stylus reaches the innermost point of its travel. De-energization relay 57 opens contacts 58 and de-energizes solenoid 28 to immediately effect lifting of the tone arm under the action of compression spring 30 and removable stop 36 engages the pin 43 to quickly return the tone arm assembly to its initial position under force provided by charged spring 42. As is shown in FIG. 1, the record is provided with an extra opening engaged by an extra pin or spindle 17 so that the record remains in fixed position relative to the turntable and position selector switch. It is apparent that the circuit of FIG. 4, including switch contacts 18, 19 and 21, is effective to energize the tone arm operating solenoid 28 at exactly the right time so that the stylus enters the spiral groove corresponding to the particular selector switch 55 or 56, for example, that has been closed.

It is apparent from the foregoing detailed description that the control system of FIG. 4 applied to the apparatus of FIG. 1 provides for the random access of information by controlling the position on a record on which the tone arm is lowered to position the stylus under the combined control of switching means having positional relationship to the individual nested grooves carrying the different recordings and a selector switch which selects information corresponding to a particular one of recorded grooves. It is particularly suited for providing random access to information recorded in nested spiral grooves and operates with such a record without an annular ready or master groove intersecting the outer ends of the spirals or with such a groove if the intersection with the individual nested spirals is spaced and shaped sufficiently to permit the stylus to track inwardly as the record rotates.

Figure 5:
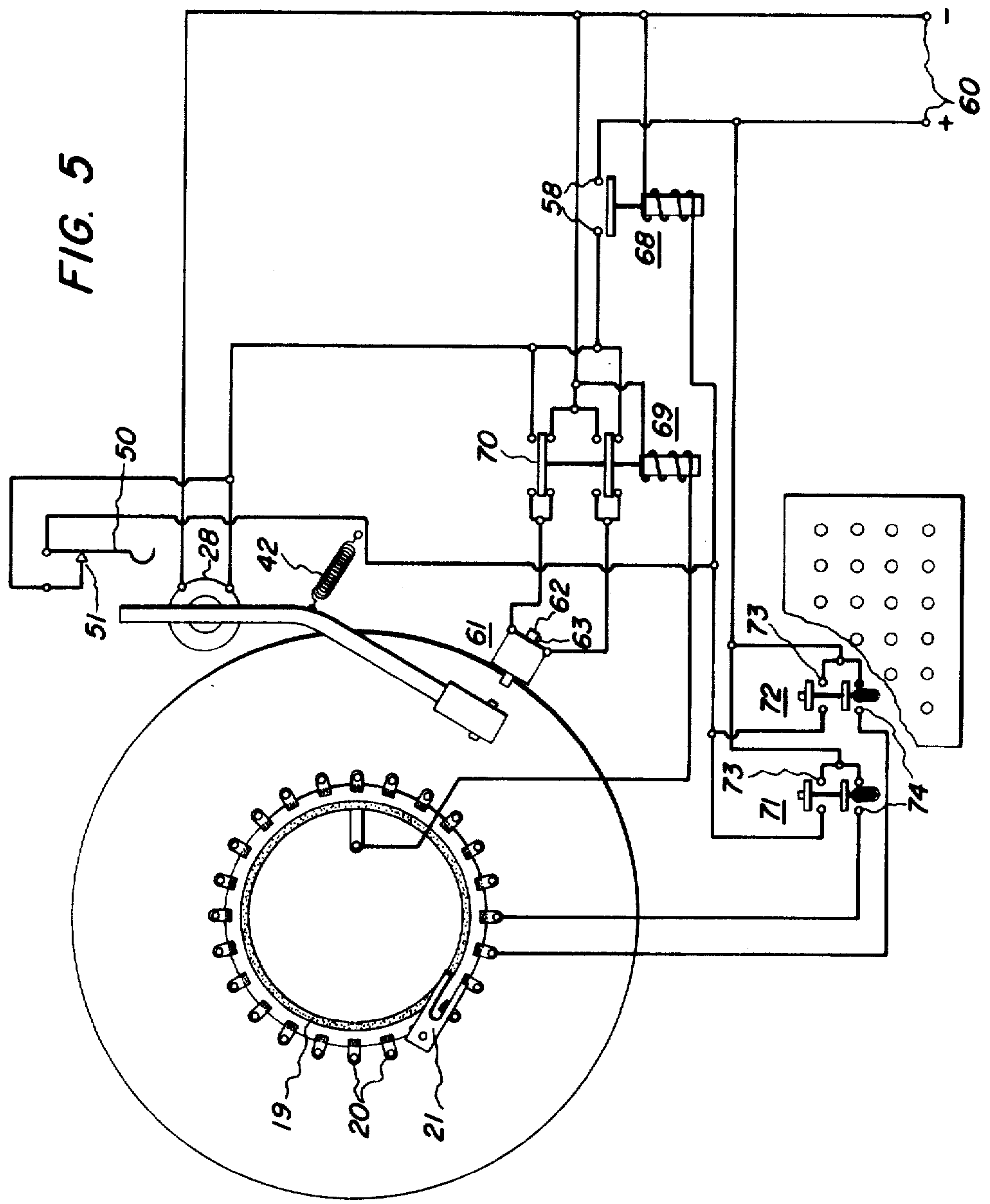
FIG. 5 is a schematic diagram illustrating the electrical control of the tone arm in accordance with the second embodiment of the invention.

In FIG. 5, there is shown a control system applied to the audio playback apparatus in FIG. 1 which is particularly adapted for random access information stored in individual nested spiral grooves under the joint action of selector and position switching means similar to FIG. 4 but makes use of additional magnetic means for positively urging the tone arm inwardly at the position of the desired nested spiral. This embodiment of the invention will be described in more detail with particular reference to FIG. 1 and FIG. 5. For utilization with the control circuit of FIG. 5, the tone arm assembly includes an electromagnet or holding coil 61 including a magnetic core 62 and a coil 63. The electromagnet is carried in a support 62 mounted on the cabinet 10 in juxtaposition to the side of the head of the tone arm 14 when the tone arm is in its outermost position. The head of the tone arm is provided with a cylindrical opening therein aligned with the core 62 of the solenoid for receiving a permanent magnet 65 which may be adjusted in position and held securely by a set screw 66. The position of the end of the core 62 with respect to the end of the permanent magnet 65 is adjusted by adjusting screw 67 carried by support 64 and bearing against the side of the head 14 of the tone arm. With this arrangement, it is apparent that the tone arm may be attracted or repelled by reversing the direction of energization of the coil 61.

The embodiment of the invention shown in FIG. 5 will now be described wherein components common to the modification in FIG. 4 have been designated by corresponding reference numerals. The system of FIG. 5 differs from the one just described in connection with FIG. 4 in several major respects. In addition to the solenoid 28 for controlling the lowering and raising of the tone arm, the electromagnetic coil assembly 61 is provided for retaining the tone arm in retracted position or urging it radially inwardly to move it from an annular ready groove into a selected one of the nested spiral grooves of the record. The control circuit includes in addition to a relay 68 corresponding generally to the relay 57 of FIG. 4, a relay 69 which controls double pole, double throw contacts connected to provide a reversing switch illustrated generally at 70 for reversing the direction of energization of the holding and release solenoid 61 under the control of the position selector switch, including contacts 19, 20 and 21, and an array of information selector switches 70, which correspond generally to the array of selector switches of FIG. 4 including switches 55 and 56. In the embodiment of FIG. 5, however, the selector switches accomplish control of both relays 68 and 69 and are accordingly each provided with two normally open sets of contacts. Two such switches have been illustrated schematically at 71 and 72. The upper contact 73 of each switch is connected in circuit with the supply 60 and the coil of relay 68 while the lower contact 74 of each switch is connected to control energization of relay 69 under the joint control of position selector switch including contacts 19, 20 and 21, and a different one of the contacts 20 of the position selector switch. As illustrated, when relay 69 is de-energized, the holding coil is energized in a direction to attract the tone arm toward it and retain it in a ready or retracted position.

The features of this embodiment of the invention shown in FIG. 5 will be better understood by a brief description of the operation thereof. Assuming that the direct current supply lines 60 are energized, relay 68 is de-energized and its associated contact 58 is open. Relay 69 is de-energized and the reversing switch is closed to energize the holding coil 63 in a direction to attract the permanent magnet 65 in the head of the tone arm. One of the selector switches 71 corresponding to information recorded in a pre-determined nested spiral is depressed, closing two sets of contacts 73 and 74. The first immediately energizes relay 68 to close its contact 58 and energize the solenoid 28. The tone arm does not drop immediately, however, since the coil 63 is still energized in a direction to retain the tone arm in retracted position. Closure of the lower selector switch contact 74 readies the energizing circuit for relay 69 so that it is closed when the position selector switch reaches a position corresponding to the nested spiral selected by switch 71. Closure of the lower contact of selector switch connects fixed contact when that position is reached by the turntable, the corresponding contact 20 of the position selector switch is closed to energize the coil of relay 69, operate the relay and reverse the energization of the holding coil 63 and urge the tone arm in a radially inward direction at precisely the right time for it to enter the selected nested spiral groove corresponding to the selector switch 71 that has been operated. The selector switch 71 may now be released, the relay 68 is sealed in maintaining the energization of the lifting solenoid 28 until such time as the tone arm reaches its innermost position and the activating arm 50 of the microswitch will open the energizing circuit for relay 68, returning the circuit to its initial condition. This permits the tone arm to quickly lift under the action of compression spring 30 and return to its outermost or ready position under the action of spring 42 and to be held in its initial position by the energization of the holding solenoid.

Figure 6:
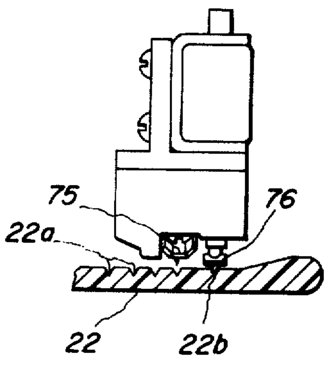
FIG. 6 is a side elevational view, partially in section, of a modified tone arm and stylus assembly.
Figure 7:
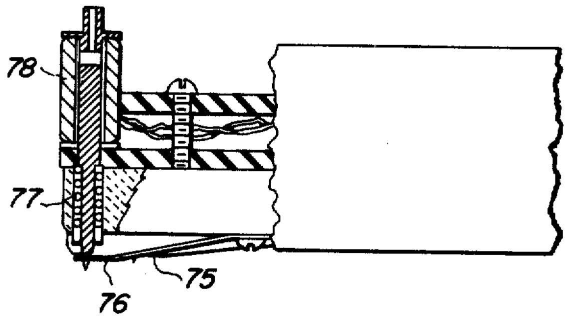
FIG. 7 is an end elevational view of the tone arm of FIG. 6.

In the modification shown in FIG. 6 and 7, the cartridge assembly includes, in addition to the regular stylus 75, an additional or guide stylus 76 laterally offset from stylus 75 and urged outwardly by coil spring 77. The stylus is adapted, when extending, to engage the annular or ready groove **22*b* of a record. The guide stylus is retractable by energization of a solenoid 78 including coil 79 mounted coaxially with the guide stylus 76**.

It is apparent that the energization of the coil 79 may be controlled by the joint action of an information selector switch such as 55 of FIG. 4 and a position selector switch such as contacts 19, 20 and 21 of FIG. 4 to retract the guide stylus at the right position for the pickup stylus 75 to enter the appropriate nested spiral groove carrying recorded information corresponding to the switch 55. As will be readily understood, the energization of solenoid 28 is controlled to lower the tone arm into ready position, in a manner similar to that described in connection with FIG. 5 so that guide stylus 76 rides in the annular ready groove **22*b***.

Figure 8:
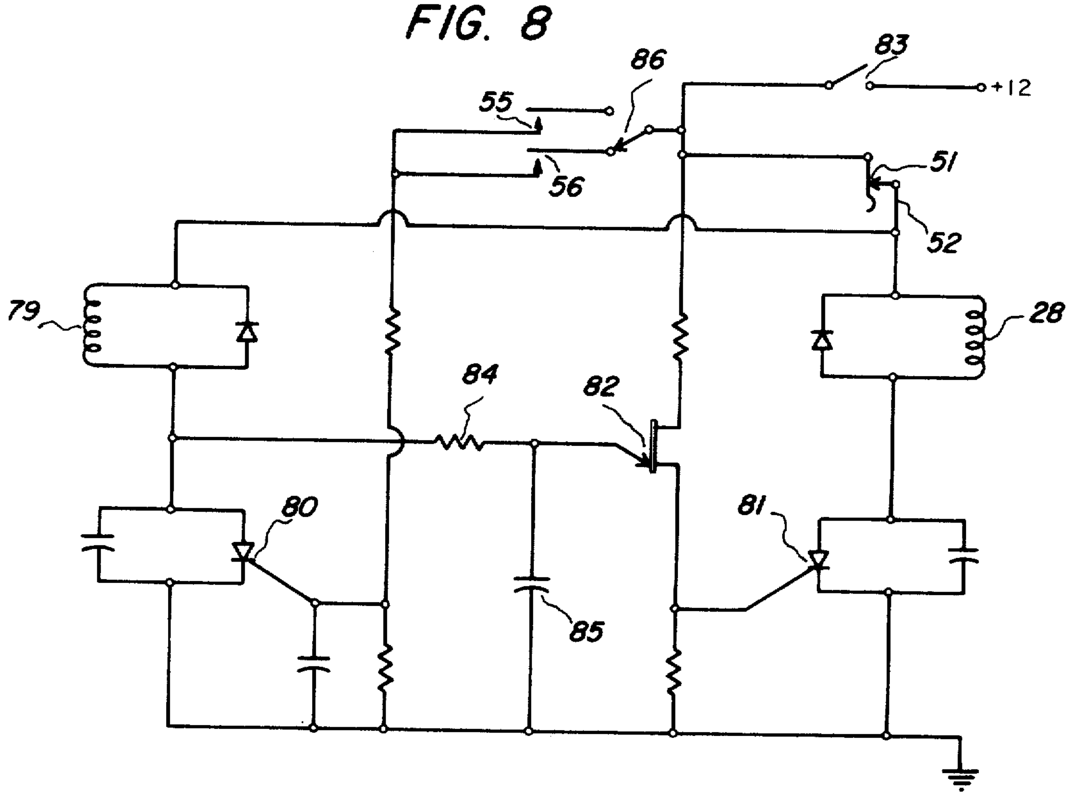
FIG. 8 is a schematic diagram of a control circuit for controlling the tone arm of FIGS. 6 and 7.

In FIG. 8, there is illustrated a solid-state circuit for accomplishing the above described control of the tone arm dropping solenoid and the stylus retracting solenoid. In FIG. 8, components corresponding to those previously described are designated by the same reference numerals. In the control circuit, the stylus retracting solenoid 79 is energized under the control of a silicon control rectifier 80 and the tone arm dropping solenoid 28 is energized under the control of silicon control rectifier 81. Initiation of conduction of the rectifier 81 is initiated by a unijunction transistor 82. As illustrated, the control circuit of the transistor 82 is connected to be energized from the 12 volt supply circuit upon closure of initiating switch 83. This control circuit includes series-connected resistor 84 and capacitor 85 to render the transistor conducting with a time delay. When transistor 82 conducts, it initiates conduction of the silicon controlled rectifier 81 to energize the solenoid 28 to lower the tone arm and allow the guide stylus to engage the ready or guide groove 22b. When the operator wishes to select a predetermined one of the nested spirals for playback of further information corresponding to information or indicia carried by the information selector switch assembly, he closes an appropriate switch such as 55. As soon as the turntable moves to a position so that the playing stylus is in position to enter the selected nested spiral groove, the position selector switch, illustrated generally at 86, completes the control circuit for silicon control rectifier 80 to energize the retracting solenoid to retract the guide stylus and allow the pickup stylus of the tone arm to engage the nested spiral groove at that position. When the tone arm is moved to its innermost position, the limit switch contacts 51 and 52 are opened and the tone arm is raised as the result of de-energization of the dropping solenoid and the tone arm is returned to its initial position by action of the spring 42.

It is apparent from the foregoing description of the three illustrated embodiments of the control circuits for the playback apparatus that the utilization of a solenoid for controlling the lifting and lowering of the tone arm together with the holding and release coil permit very flexible control of the playback apparatus to accomplish precise selection of a desired recorded message, particularly messages stored on nested spiral grooves. Many variations of the control of the solenoid and coil are possible to effect refinements of operation in readying the tone arm for entrance into the selected groove. For example, in the second embodiment, the holding coil may be momentarily de-energized, the solenoid energized for lowering the tone arm and then the holding solenoid re-energized to hold in a direction to retain the tone arm in ready position against the outward wall of the ready groove of a record to minimize wear of that groove. Since the tone arm has lowered away from the permanent magnet the pull of the holding magnet, it is not enough to lift it out of the groove.

From the foregoing detailed description of a number of embodiments of our invention, it is apparent that a very flexible random access audio playback apparatus is provided, particularly useful with nested spiral groove type recordings, and particularly applicable, for example, to what may be termed "talking books" or other display apparatus in which an electric switch is associated with indicia corresponding to further related information recorded on a predetermined nested spiral groove and the operation of a selector switch corresponding to any indicia cooperates with a position-responsive switch for effective movement of the tone arm into playback relation with the corresponding nested spiral groove.

What we claim as new and desire to secure by Letters Patent of the United States is:

1. An audio playback apparatus including a main support, a turntable mounted from said main support for rotation about a first axis, a tone arm support mounted on said main support for rotation about an axis parallel to said first axis, a tone arm assembly including a stylus mounted on said tone arm support for pivotal movement toward and away from a record carried by said turntable, said record including a plurality of independent information grooves thereon in interleaved relation and each terminating at spaced points along the periphery of said record, an actuating member moveable to move said tone arm assembly pivotally including spring means urging said actuating member to a position to move said tone arm assembly away from a record on said turntable, a solenoid for retracting said member and switch means including a position selector switch means for controlling the energization of said solenoid, said switch means including an annular contact and an annular array of individual radially extending contacts corresponding to the number of said plurality of grooves, said annular contact and said array of switches being secured to said main support beneath said turntable, said switch means further including a bridging contact secured to the lower side of said turntable and positioned so as to connect the individual radially extending contacts to said annular contact progressively as said turntable rotates, said switch means operable in response to the angular position of said turntable about its first axis to lower said tone arm assembly and move the stylus thereof into operative position in one of said spaced points about the periphery of said record.

2. The apparatus of claim 1 in which said tone arm support is urged in a direction to move the tone arm radially outwardly by spring means which is charged in response to energization of said solenoid and in which switch means operated by movement of the tone arm to its innermost position de-energizes the solenoid to effect lifting and return thereof to its radially outward position under the action of said spring means.

* * * * *